US012586241B2

(12) United States Patent
Kong et al.

(10) Patent No.: US 12,586,241 B2
(45) Date of Patent: Mar. 24, 2026

(54) POSITION DETERMINATION METHOD, DEVICE, AND SYSTEM, AND COMPUTER-READABLE STORAGE MEDIUM

(71) Applicant: BEIJING JINGDONG QIANSHI TECHNOLOGY CO., LTD., Beijing (CN)

(72) Inventors: Qi Kong, Beijing (CN); Jinfeng Zhang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 430 days.

(21) Appl. No.: 18/004,508

(22) PCT Filed: May 18, 2021

(86) PCT No.: PCT/CN2021/094394
§ 371 (c)(1),
(2) Date: Jan. 6, 2023

(87) PCT Pub. No.: WO2022/007504
PCT Pub. Date: Jan. 13, 2022

(65) Prior Publication Data
US 2023/0252674 A1 Aug. 10, 2023

(30) Foreign Application Priority Data
Jul. 9, 2020 (CN) .......................... 202010658041.5

(51) Int. Cl.
*G06T 7/73* (2017.01)
*G01S 17/06* (2006.01)

(52) U.S. Cl.
CPC ................ *G06T 7/74* (2017.01); *G01S 17/06* (2013.01)

(58) Field of Classification Search
CPC .................................. G06T 7/74; G01S 17/06
See application file for complete search history.

(56) References Cited

U.S. PATENT DOCUMENTS

| | | | |
|---|---|---|---|
| 2009/0310867 A1 | 12/2009 | Matei et al. | |
| 2019/0205695 A1* | 7/2019 | Yan | G06V 10/757 |

(Continued)

FOREIGN PATENT DOCUMENTS

| | | |
|---|---|---|
| CN | 106969763 A | 7/2017 |
| CN | 108225345 A | 6/2018 |

(Continued)

OTHER PUBLICATIONS

"Communication with Supplementary European Search Report", EP Application No. 21837484.1, Jun. 7, 2024, 9 pp.

(Continued)

*Primary Examiner* — Wednel Cadeau
(74) *Attorney, Agent, or Firm* — Myers Bigel, P.A.

(57) ABSTRACT

This disclosure relates to a position determination method, device, system, and computer-readable storage medium, and relates to the field of computer technologies. The method of the present disclosure includes acquiring laser point cloud data measured at a current position point of a vehicle as reference point cloud data, and acquiring point cloud data corresponding to a preset starting point of the vehicle in a point cloud map as target point cloud data; matching the target point cloud data with the reference point cloud data to determine a transformation matrix between the target point cloud data and the reference point cloud data; and determining coordinate information of the current position point according to coordinate information of the preset starting point and the transformation matrix.

16 Claims, 4 Drawing Sheets

(56)  References Cited

U.S. PATENT DOCUMENTS

| 2019/0226852 | A1 |  | 7/2019 | Xie et al. |
| 2019/0323844 | A1* | 10/2019 | Yendluri | ................. G01S 17/86 |
| 2020/0033479 | A1 |  | 1/2020 | Schultz et al. |
| 2022/0091274 | A1* | 3/2022 | Kim | ........................ G01S 19/40 |

FOREIGN PATENT DOCUMENTS

| CN | 109059906 | A | 12/2018 |
| CN | 109887028 | A | 6/2019 |
| CN | 109900298 | A | 6/2019 |
| CN | 110082779 | A | 8/2019 |
| CN | 110609290 | A | 12/2019 |
| CN | 110794392 | A | 2/2020 |
| CN | 110927740 | A | 3/2020 |
| CN | 110988894 | A | 4/2020 |
| CN | 111812658 | A | 10/2020 |

OTHER PUBLICATIONS

"First Office Action and English language translation", CN Application No. 202010658041.5, May 14, 2021, 15 pp.
"International Search Report and Written Opinion of the International Searching Authority with English language translation", International Application No. PCT/CN2021/094394, Aug. 17, 2021, 19 pp.

* cited by examiner

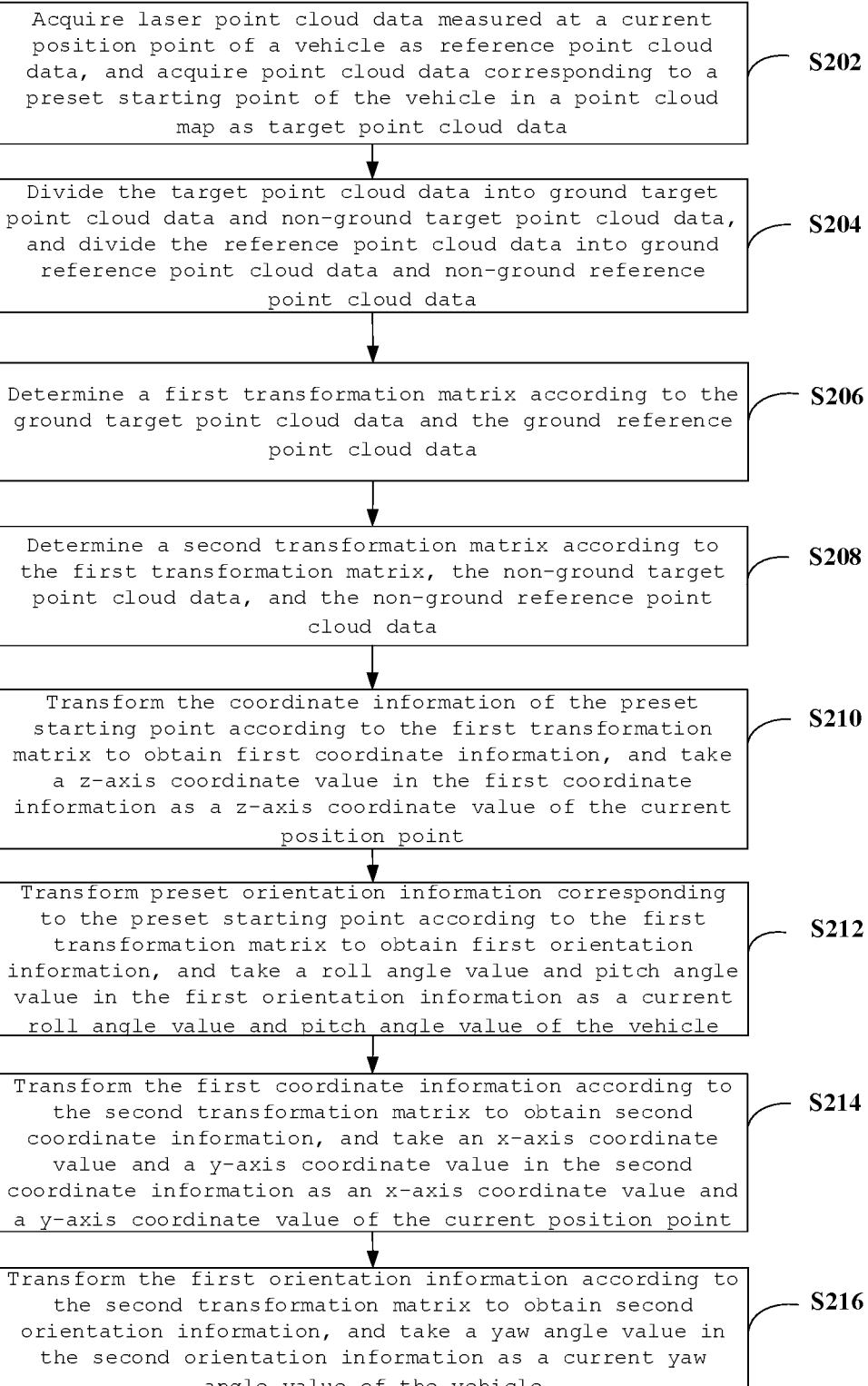

Acquire laser point cloud data measured at a current
position point of a vehicle as reference point cloud
data, and acquire point cloud data corresponding to a
preset starting point of the vehicle in a point cloud
map as target point cloud data ⟶ S202

Divide the target point cloud data into ground target
point cloud data and non-ground target point cloud data,
and divide the reference point cloud data into ground
reference point cloud data and non-ground reference
point cloud data ⟶ S204

Determine a first transformation matrix according to the
ground target point cloud data and the ground reference
point cloud data ⟶ S206

Determine a second transformation matrix according to
the first transformation matrix, the non-ground target
point cloud data, and the non-ground reference point
cloud data ⟶ S208

Transform the coordinate information of the preset
starting point according to the first transformation
matrix to obtain first coordinate information, and take
a z-axis coordinate value in the first coordinate
information as a z-axis coordinate value of the current
position point ⟶ S210

Transform preset orientation information corresponding
to the preset starting point according to the first
transformation matrix to obtain first orientation
information, and take a roll angle value and pitch angle
value in the first orientation information as a current
roll angle value and pitch angle value of the vehicle ⟶ S212

Transform the first coordinate information according to
the second transformation matrix to obtain second
coordinate information, and take an x-axis coordinate
value and a y-axis coordinate value in the second
coordinate information as an x-axis coordinate value and
a y-axis coordinate value of the current position point ⟶ S214

Transform the first orientation information according to
the second transformation matrix to obtain second
orientation information, and take a yaw angle value in
the second orientation information as a current yaw
angle value of the vehicle ⟶ S216

POSITION DETERMINATION METHOD, DEVICE, AND SYSTEM, AND COMPUTER-READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2021/094394, filed on May 18, 2021, which is based on and claims priority of Chinese application for invention No. 202010658041.5 filed on Jul. 9, 2020, the disclosures of both of which are hereby incorporated into this disclosure by reference in its entirety.

TECHNICAL FIELD

This disclosure relates to the field of computer technologies, and particularly, to a position determination method, device, system, and computer-readable storage medium.

BACKGROUND

A vehicle in an automatic driving state needs to know its own position in a map in real time, and particularly its initial position is important. For a scene where the vehicle starts at or near a preset starting point, the vehicle also needs to be positioned before starting, to determine its own accurate position.

At present, a vehicle generally employs GPS (Global Positioning System) or GPS and INS (Inertial Navigation System) combined devices to determine the initial position.

SUMMARY

According to some embodiments of the present disclosure, there is provided a position determination method, comprising: acquiring laser point cloud data measured at a current position point of a vehicle as reference point cloud data, and acquiring point cloud data corresponding to a preset starting point of the vehicle in a point cloud map as target point cloud data; matching the target point cloud data with the reference point cloud data to determine a transformation matrix between the target point cloud data and the reference point cloud data; and determining coordinate information of the current position point according to coordinate information of the preset starting point and the transformation matrix.

In some embodiments, the matching the target point cloud data with the reference point cloud data to determine a transformation matrix between the target point cloud data and the reference point cloud data comprises: dividing the target point cloud data into ground target point cloud data and non-ground target point cloud data, and dividing the reference point cloud data into ground reference point cloud data and non-ground reference point cloud data; determining a first transformation matrix according to the ground target point cloud data and the ground reference point cloud data; and determining a second transformation matrix according to the first transformation matrix, the non-ground target point cloud data, and the non-ground reference point cloud data.

In some embodiments, the determining a first transformation matrix according to the ground target point cloud data and the ground reference point cloud data comprises: performing a down-sampling processing on the ground reference point cloud data to obtain down-sampled ground reference point cloud data; and matching the ground target point cloud data with the down-sampled ground reference point cloud data to obtain a rotation translation matrix from the ground target point cloud data to the down-sampled ground reference point cloud data as the first transformation matrix.

In some embodiments, the determining a second transformation matrix according to the first transformation matrix, the non-ground target point cloud data, and the non-ground reference point cloud data comprises: transforming the non-ground target point cloud data according to the first transformation matrix to obtain transformed non-ground target point cloud data; performing a down-sampling processing on the non-ground reference point cloud data to obtain down-sampled non-ground reference point cloud data; and matching the transformed non-ground target point cloud data with the down-sampled non-ground reference point cloud data to obtain a rotation translation matrix from the transformed non-ground target point cloud data to the down-sampled non-ground reference point cloud data as the second transformation matrix.

In some embodiments, the determining coordinate information of the current position point according to coordinate information of the preset starting point and the transformation matrix comprises: transforming the coordinate information of the preset starting point according to the first transformation matrix to obtain first coordinate information, and taking a z-axis coordinate value in the first coordinate information as a z-axis coordinate value of the current position point; and transforming the first coordinate information according to the second transformation matrix to obtain second coordinate information, and taking an x-axis coordinate value and a y-axis coordinate value in the second coordinate information as an x-axis coordinate value and a y-axis coordinate value of the current position point.

In some embodiments, the method further comprises: transforming preset orientation information corresponding to the preset starting point according to the first transformation matrix to obtain first orientation information, and taking a roll angle value and a pitch angle value in the first orientation information as a current roll angle value and a pitch angle value of the vehicle; and transforming the first orientation information according to the second transformation matrix to obtain second orientation information, and taking a yaw angle value in the second orientation information as a current yaw angle value of the vehicle.

In some embodiments, the acquiring point cloud data corresponding to a preset starting point of the vehicle in a point cloud map as target point cloud data comprises: acquiring, in the point cloud map, point cloud data centered on the preset starting point and within a range corresponding to a lidar measurement range as the target point cloud data, according to the lidar measurement range corresponding to the reference point cloud data.

According to still other embodiments of the present disclosure, there is provided a position determination device, comprising: a processor; and a memory coupled to the processor and storing instructions which, when executed by the processor, cause the processor to: acquire laser point cloud data measured at a current position point of a vehicle as reference point cloud data, and acquire point cloud data corresponding to a preset starting point of the vehicle in a point cloud map as target point cloud data; match the target point cloud data with the reference point cloud data to determine a transformation matrix between the target point cloud data and the reference point cloud data; and determine coordinate information of the current position point according to coordinate information of the preset starting point and the transformation matrix.

In some embodiments, the matching the target point cloud data with the reference point cloud data to determine a transformation matrix between the target point cloud data and the reference point cloud data comprises: dividing the target point cloud data into ground target point cloud data and non-ground target point cloud data, and dividing the reference point cloud data into ground reference point cloud data and non-ground reference point cloud data; determining a first transformation matrix according to the ground target point cloud data and the ground reference point cloud data; and determining a second transformation matrix according to the first transformation matrix, the non-ground target point cloud data, and the non-ground reference point cloud data.

In some embodiments, the determining a first transformation matrix according to the ground target point cloud data and the ground reference point cloud data comprises: performing a down-sampling processing on the ground reference point cloud data to obtain down-sampled ground reference point cloud data; and matching the ground target point cloud data with the down-sampled ground reference point cloud data to obtain a rotation translation matrix from the ground target point cloud data to the down-sampled ground reference point cloud data as the first transformation matrix.

In some embodiments, the determining a second transformation matrix according to the first transformation matrix, the non-ground target point cloud data, and the non-ground reference point cloud data comprises: transforming the non-ground target point cloud data according to the first transformation matrix to obtain transformed non-ground target point cloud data; performing a down-sampling processing on the non-ground reference point cloud data to obtain down-sampled non-ground reference point cloud data; and matching the transformed non-ground target point cloud data with the down-sampled non-ground reference point cloud data to obtain a rotation translation matrix from the transformed non-ground target point cloud data to the down-sampled non-ground reference point cloud data as the second transformation matrix.

In some embodiments, the determining coordinate information of the current position point according to coordinate information of the preset starting point and the transformation matrix comprises: transforming the coordinate information of the preset starting point according to the first transformation matrix to obtain first coordinate information, and taking a z-axis coordinate value in the first coordinate information as a z-axis coordinate value of the current position point; and transforming the first coordinate information according to the second transformation matrix to obtain second coordinate information, and taking an x-axis coordinate value and a y-axis coordinate value in the second coordinate information as an x-axis coordinate value and a y-axis coordinate value of the current position point.

In some embodiments, the memory further stores instructions which, when executed by the processor, cause the processor to: transform preset orientation information corresponding to the preset starting point according to the first transformation matrix to obtain first orientation information, and take a roll angle value and a pitch angle value in the first orientation information as a current roll angle value and a pitch angle value of the vehicle; and transform the first orientation information according to the second transformation matrix to obtain second orientation information, and take a yaw angle value in the second orientation information as a current yaw angle value of the vehicle.

In some embodiments, the acquiring point cloud data corresponding to a preset starting point of the vehicle in a point cloud map as target point cloud data comprises: acquiring, in the point cloud map, point cloud data centered on the preset starting point and within a range corresponding to a lidar measurement range as the target point cloud data, according to the lidar measurement range corresponding to the reference point cloud data.

According to further embodiments of the present disclosure, there is provided a non-transitory computer-readable storage medium storing computer programs, which when executed by a processor, cause the processor to: acquire laser point cloud data measured at a current position point of a vehicle as reference point cloud data, and acquire point cloud data corresponding to a preset starting point of the vehicle in a point cloud map as target point cloud data; match the target point cloud data with the reference point cloud data to determine a transformation matrix between the target point cloud data and the reference point cloud data; and determine coordinate information of the current position point according to coordinate information of the preset starting point and the transformation matrix.

In some embodiments, the matching the target point cloud data with the reference point cloud data to determine a transformation matrix between the target point cloud data and the reference point cloud data comprises: dividing the target point cloud data into ground target point cloud data and non-ground target point cloud data, and dividing the reference point cloud data into ground reference point cloud data and non-ground reference point cloud data; determining a first transformation matrix according to the ground target point cloud data and the ground reference point cloud data; and determining a second transformation matrix according to the first transformation matrix, the non-ground target point cloud data, and the non-ground reference point cloud data.

In some embodiments, the determining a first transformation matrix according to the ground target point cloud data and the ground reference point cloud data comprises: performing a down-sampling processing on the ground reference point cloud data to obtain down-sampled ground reference point cloud data; and matching the ground target point cloud data with the down-sampled ground reference point cloud data to obtain a rotation translation matrix from the ground target point cloud data to the down-sampled ground reference point cloud data as the first transformation matrix.

In some embodiments, the determining a second transformation matrix according to the first transformation matrix, the non-ground target point cloud data, and the non-ground reference point cloud data comprises: transforming the non-ground target point cloud data according to the first transformation matrix to obtain transformed non-ground target point cloud data; performing a down-sampling processing on the non-ground reference point cloud data to obtain down-sampled non-ground reference point cloud data; and matching the transformed non-ground target point cloud data with the down-sampled non-ground reference point cloud data to obtain a rotation translation matrix from the transformed non-ground target point cloud data to the down-sampled non-ground reference point cloud data as the second transformation matrix.

In some embodiments, the determining coordinate information of the current position point according to coordinate information of the preset starting point and the transformation matrix comprises: transforming the coordinate information of the preset starting point according to the first transformation matrix to obtain first coordinate information, and taking a z-axis coordinate value in the first coordinate information as a z-axis coordinate value of the current position point; and transforming the first coordinate information according to the second transformation matrix to obtain second coordinate information, and taking an x-axis coordinate value and a y-axis coordinate value in the second coordinate information as an x-axis coordinate value and a y-axis coordinate value of the current position point.

In some embodiments, the memory further stores instructions which, when executed by the processor, cause the processor to: transform preset orientation information corresponding to the preset starting point according to the first transformation matrix to obtain first orientation information, and take a roll angle value and a pitch angle value in the first orientation information as a current roll angle value and a pitch angle value of the vehicle; and transform the first orientation information according to the second transformation matrix to obtain second orientation information, and take a yaw angle value in the second orientation information as a current yaw angle value of the vehicle.

In some embodiments, the acquiring point cloud data corresponding to a preset starting point of the vehicle in a point cloud map as target point cloud data comprises: acquiring, in the point cloud map, point cloud data centered on the preset starting point and within a range corresponding to a lidar measurement range as the target point cloud data, according to the lidar measurement range corresponding to the reference point cloud data.

According to still other embodiments of the present disclosure, there is provided a position determination system, comprising: the position determination device according to any of the foregoing embodiments; a vehicle body, on which the position determination device is arranged; and a lidar device arranged on the vehicle body and configured to scan at a current position point to obtain laser point cloud data.

In some embodiments, the matching the target point cloud data with the reference point cloud data to determine a transformation matrix between the target point cloud data and the reference point cloud data comprises: dividing the target point cloud data into ground target point cloud data and non-ground target point cloud data, and dividing the reference point cloud data into ground reference point cloud data and non-ground reference point cloud data; determining a first transformation matrix according to the ground target point cloud data and the ground reference point cloud data; and determining a second transformation matrix according to the first transformation matrix, the non-ground target point cloud data, and the non-ground reference point cloud data.

In some embodiments, the determining a first transformation matrix according to the ground target point cloud data and the ground reference point cloud data comprises: performing a down-sampling processing on the ground reference point cloud data to obtain down-sampled ground reference point cloud data; and matching the ground target point cloud data with the down-sampled ground reference point cloud data to obtain a rotation translation matrix from the ground target point cloud data to the down-sampled ground reference point cloud data as the first transformation matrix.

In some embodiments, the determining a second transformation matrix according to the first transformation matrix, the non-ground target point cloud data, and the non-ground reference point cloud data comprises: transforming the non-ground target point cloud data according to the first transformation matrix to obtain transformed non-ground target point cloud data; performing a down-sampling processing on the non-ground reference point cloud data to obtain down-sampled non-ground reference point cloud data; and matching the transformed non-ground target point cloud data with the down-sampled non-ground reference point cloud data to obtain a rotation translation matrix from the transformed non-ground target point cloud data to the down-sampled non-ground reference point cloud data as the second transformation matrix.

In some embodiments, the determining coordinate information of the current position point according to coordinate information of the preset starting point and the transformation matrix comprises: transforming the coordinate information of the preset starting point according to the first transformation matrix to obtain first coordinate information, and taking a z-axis coordinate value in the first coordinate information as a z-axis coordinate value of the current position point; and transforming the first coordinate information according to the second transformation matrix to obtain second coordinate information, and taking an x-axis coordinate value and a y-axis coordinate value in the second coordinate information as an x-axis coordinate value and a y-axis coordinate value of the current position point.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or technical solutions in the prior art, the accompanying drawings that need to be used in the description of the embodiments or the prior art will be briefly described below, it is obvious that the drawings in the following description are only some embodiments of the present disclosure, and other drawings can be obtained by one of ordinary skill in the art without paying creative efforts.

FIG. 2 illustrates a flow diagram of a position determination method according to other embodiments of the disclosure.

DETAILED DESCRIPTION

The technical solutions in the embodiments of the present disclosure will be described clearly and completely in conjunction with the drawings in the embodiments of the present disclosure, and it is obvious that the described embodiments are only some embodiments of the present disclosure, rather than all embodiments. The following description of at least one exemplary embodiment is merely illustrative in nature and is in no way intended to limit this disclosure and its application or use. All other embodiments, which can be derived by one of ordinary skill in the art from the embodiments in this disclosure without making any creative effort, shall fall within the protection scope of the present disclosure.

The inventors have found that: at present, determination of an initial position of a vehicle depends heavily on GPS, and when a GPS signal at the initial position is poor or even none, there will be a large error in a position given by the GPS or the position cannot be given, which will lead to a failure of the determination of the initial position, and affect a subsequent automatic driving process of the vehicle.

One technical problem to be solved by the present disclosure is: improving accuracy of a position determination of a vehicle in a scene where the vehicle starts at or near a preset starting point.

For a scene where a vehicle starts at or near a preset starting point, the present disclosure provides a vehicle position determination method, which will be described below in conjunction with FIG. 1.

Figure 1:
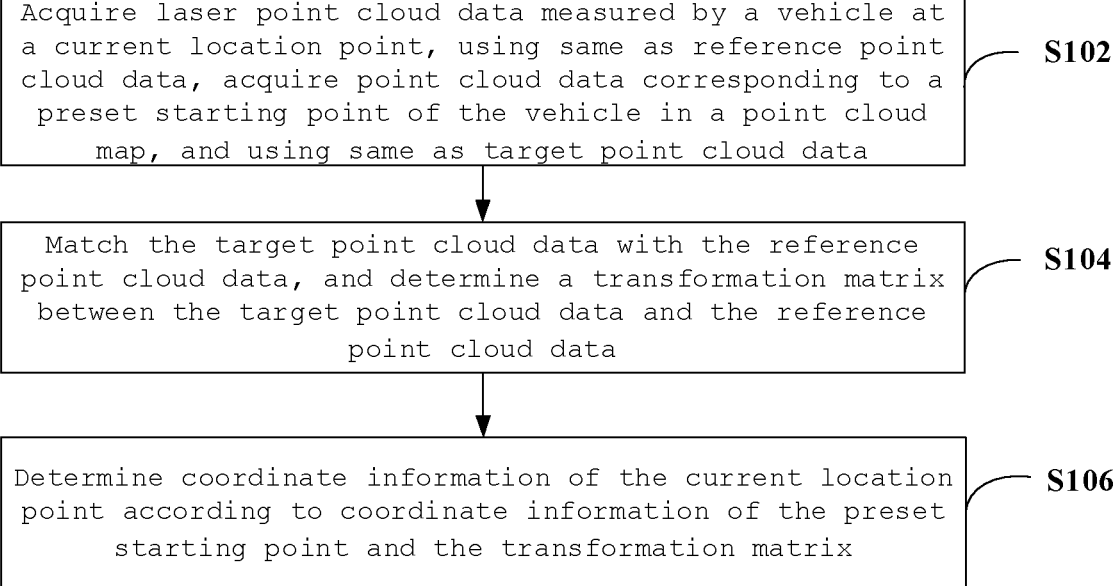
FIG. 1 illustrates a schematic flow diagram of a position determination method according to some embodiments of the present disclosure.

FIG. 1 is a flow diagram of a position determination method according to some embodiments of the present disclosure. As shown in FIG. 1, the method of this embodiment comprises: steps S102 to S106.

In the step S102, laser point cloud data measured at a current position point of a vehicle is acquired as reference point cloud data, and point cloud data corresponding to a preset starting point of the vehicle in a point cloud map is acquired as target point cloud data.

Position information of the preset starting point can be measured in advance, only needs to be measured once and can be used permanently. The position information of the preset starting point can be expressed in different ways according to different coordinate systems used by the vehicle. For example, if the vehicle uses a WGS84 coordinate system, the position information of the preset starting point can be expressed in a form of longitude and latitude, and if the vehicle uses a SLAM map, the position information of the preset starting point can be expressed with a relative position of the vehicle with respect to an origin of the SLAM map, which is not limited to the illustrated examples.

The position information of the preset starting point can be bound with an instruction of a client. For example, the preset starting point is named home point, and the instruction of the client is named home pose. Before the vehicle enters an automatic driving state, the vehicle is arranged at or near the preset starting point, the home pose instruction is issued to the vehicle by the client on a premise that the vehicle has been powered on. After receiving the position information of the preset starting point, a position determination device can utilize the laser point cloud data measured by a lidar scanning an surrounding environment as the reference point cloud data, and acquire a high-accurate point cloud map according to the position information of the preset starting point, and acquire the point cloud data corresponding to the preset starting point in the point cloud map as the target point cloud data.

In some embodiments, point cloud data centered on the preset starting point and within a range corresponding to a lidar measurement range is acquired in the point cloud map, as the target point cloud data, according to the lidar measurement range corresponding to the reference point cloud data. If a coordinate system corresponding to the position information of the preset starting point is different from a coordinate system of the point cloud map, the position information of the preset starting point can be firstly transformed into the coordinate system of the point cloud map. The range of the target point cloud data can be equal to or greater than the lidar measurement range.

If a coordinate system of the laser point cloud data measured at the current position point of the vehicle is different from the coordinate system of the point cloud map. For example, the coordinate system of the laser point cloud data is a lidar coordinate system, and the laser point cloud data can be transformed from the lidar coordinate system to the coordinate system of the point cloud map, as the reference point cloud data.

In the step S104, the target point cloud data is matched with the reference point cloud data to determine a transformation matrix between the target point cloud data and the reference point cloud data.

The target point cloud data can be matched with the reference point cloud data by employing a point cloud registration algorithm, such as an ICP (Iterative Closest Point) algorithm, a GICP (Generalized Iterative Closest Point) algorithm, an NDT (Normal Distribution Transform) algorithm, a positioning algorithm based on multiresolution Gaussian mixture maps, or the like, which is not limited to these examples. After the target point cloud data is matched with the reference point cloud data, a transformation matrix from the target point cloud data to the reference point cloud data can be obtained. The transformation matrix can be a 4×4 rotation translation matrix, and an error between the target point cloud data after a rotation translation transformation according to the transformation matrix and the reference point cloud data satisfies a preset condition.

In the step S106, coordinate information of the current position point is determined according to the coordinate information of the preset starting point and the transformation matrix.

For example, the coordinate information of the preset starting point is expressed as (x, y, z), the transformation matrix is expressed as $$\begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix},$$

and then the coordinate information (x', y', z') of the current position point can be determined according to $$[x', y', z', 1] = [x, y, z, 1] \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix}.$$

Coordinate values of x, y, z axes, such as (x, y, z) and (x', y', z'), in the map coordinate system can express longitude values, latitude values, and altitude values, respectively.

According to the method of the above embodiments, the laser point cloud data measured at the current position point of the vehicle is taken as the reference point cloud data, and the point cloud data corresponding to the preset starting point of the vehicle in the point cloud map is taken as the target point cloud data; the target point cloud data is matched with the reference point cloud data, to determine a transformation matrix between the target point cloud data and the reference point cloud data; and the coordinate information of the current position point is determined according to the coordinate information of the preset starting point and the transformation matrix. The method of the above embodiment is suitable for the scene where the vehicle starts at or near the preset starting point, does not depend on the GPS device, solves the problem that the position of the vehicle cannot be determined due to poor or even no GPS signals, so that the vehicle can rapidly obtain an accurate initial position in various complex environments, to improve the accuracy of the position determination.

To further improve the accuracy of the position determination, the present disclosure improves an process of matching the target point cloud data with the reference point cloud data, which will be described below in conjunction with FIG. 2.

FIG. 2 is a flow diagram of a position determination method according to other embodiments of the present disclosure. As shown in FIG. 2, the method of this embodiment comprises: S202 to S216.

In the step S202, laser point cloud data measured at a current position point of a vehicle is acquired as reference point cloud data, and point cloud data corresponding to a preset starting point of the vehicle in a point cloud map is acquired as target point cloud data.

In the step S204, the target point cloud data is divided into ground target point cloud data and non-ground target point cloud data, and the reference point cloud data is divided into ground reference point cloud data and non-ground reference point cloud data.

A method of dividing point cloud data into ground point cloud data and non-ground point cloud data, that is, dividing the target point cloud data into the ground target point cloud data and the non-ground target point cloud data, and dividing the reference point cloud data into the ground reference point cloud data and the non-ground reference point cloud data, can employ the prior art, which will not be repeated here.

In the step S206, a first transformation matrix is determined according to the ground target point cloud data and the ground reference point cloud data.

In some embodiments, a down-sampling processing can be performed on the ground reference point cloud data to obtain down-sampled ground reference point cloud data; and the ground target point cloud data is matched with the down-sampled ground reference point cloud data to obtain a rotation translation matrix from the ground target point cloud data to the down-sampled ground reference point cloud data as the first transformation matrix. An amount of data processed can be reduced through the down-sampling processing, so that a matching efficiency is improved. The down-sampled ground reference point cloud data can be matched with the ground target point cloud data in density, distances between points and the like. The ground target point cloud data can be matched with the down-sampled ground reference point cloud data by employing an ICP algorithm to obtain the first transformation matrix $M_1$.

In the step S208, a second transformation matrix is determined according to the first transformation matrix, the non-ground target point cloud data, and the non-ground reference point cloud data.

In some embodiments, the non-ground target point cloud data is transformed according to the first transformation matrix to obtain transformed non-ground target point cloud data; a down-sampling processing is performed on the non-ground reference point cloud data to obtain down-sampled non-ground reference point cloud data; and the transformed non-ground target point cloud data is matched with the down-sampled non-ground reference point cloud data to obtain a rotation translation matrix from the transformed non-ground target point cloud data to the down-sampled non-ground reference point cloud data as the second transformation matrix. After the non-ground target point cloud data is transformed using the first transformation matrix, the transformed non-ground target point cloud data is closer to the non-ground reference point cloud data. Further, the transformed non-ground target point cloud data is matched with the down-sampled non-ground reference point cloud data, to improve the accuracy. An amount of data processed can be reduced through the down-sampling processing, so that a matching efficiency is improved. The transformed non-ground target point cloud data can be matched with the down-sampled non-ground reference point cloud data by employing an algorithm such as a positioning algorithm based on multiresolution Gaussian mixture maps, to obtain the second transformation matrix $M_2$.

In the step S210, the coordinate information of the preset starting point is transformed according to the first transformation matrix to obtain first coordinate information, and a z-axis coordinate value in the first coordinate information is taken as a z-axis coordinate value of the current position point. The z-axis coordinate value of the current position point can express an altitude of the current position point.

In the step S212, preset orientation information corresponding to the preset starting point is transformed according to the first transformation matrix to obtain first orientation information, and a roll angle value and pitch angle value in the first orientation information are taken as a current roll angle value and pitch angle value of the vehicle.

According to the matching of the ground target point cloud data and the ground reference point cloud data, changes in the altitudes, the roll angles and the pitch angles can be more accurately determined. Therefore, by adopting the first transformation matrix $M_1$, the z-axis coordinate value of the current position point, the current roll angle value and pitch angle value of the vehicle are determined more accurately.

The preset orientation information corresponding to the preset starting point can be orientation information when the point cloud data corresponding to the preset starting point in the point cloud map is generated. The preset orientation information comprises a preset roll angle value, a preset pitch angle value and a preset yaw angle value, which can all be 0 by default in general. Assuming that the coordinate information of the preset starting point is expressed as $P_0 = (x, y, z)$ and an orientation matrix R (for example, a 3×3 matrix) is obtained according to the preset orientation information corresponding to the preset starting point, a pose (position and orientation) matrix $$\begin{bmatrix} R & P_0^T \\ 0_{1\times3} & 1 \end{bmatrix}$$

of the preset starting point can be obtained. The pose matrix is a 4×4 matrix, and a first pose matrix of the current position point can be obtained by multiplying the pose matrix by the first transformation matrix $M_1$. The first coordinate information and the first orientation information can be obtained according to the first pose matrix, so that the z-axis coordinate value of the current position point, and the current roll angle value and pitch angle value of the vehicle are obtained.

The steps S210 and S212 can be executed in parallel after the step S206.

In the step S214, the first coordinate information is transformed according to the second transformation matrix to obtain second coordinate information, and an x-axis coordinate value and a y-axis coordinate value in the second coordinate information are taken as an x-axis coordinate value and a y-axis coordinate value of the current position point. The x-axis coordinate value and the y-axis coordinate value of the current position point can express longitude and latitude of the current position point in the point cloud map coordinate system, respectively.

In the step S216, the first orientation information is transformed according to the second transformation matrix to obtain second orientation information, and a yaw angle value in the second orientation information is taken as a current yaw angle value of the vehicle.

The first pose matrix and the second transformation matrix $M_2$ can be multiplied to obtain a second pose matrix, and the second coordinate information and the second orientation information are obtained according to the second pose matrix, so that the x-axis coordinate value and the y-axis coordinate value of the current position point and the current yaw angle value of the vehicle are obtained. According to the matching of the non-ground target point cloud data and the non-ground reference point cloud data, changes in the longitudes, the latitudes and the yaw angles can be determined more accurately. Therefore, according to the second transformation matrix $M_2$, the x-axis coordinate value and the y-axis coordinate value of the current position point and the current yaw angle value of the vehicle are determined more accurately.

The steps S214 and S216 can be executed in parallel. In the above embodiments, reference can be made to the prior art for the transformation between the coordinate systems, the transformation of the pose matrix, and the like, which will not be repeated here.

According to the method of the above embodiments, the point cloud data are divided into the ground point cloud data and the non-ground point cloud data, two times of matching are performed respectively according to the ground target point cloud data and the ground reference point cloud data, and the non-ground target point cloud data and the non-ground reference point cloud data, to determine the first transformation matrix and the second transformation matrix, respectively. By means of the matching of the ground target point cloud data and the ground reference point cloud data, the changes in the altitudes, the pitch angles, and the roll angles of the preset starting point and the current position point can be more accurately determined, and by means of the matching of the non-ground target point cloud data and the non-ground reference point cloud data, the changes in the longitudes, the latitudes and the yaw angles of the preset starting point and the current position point can be more accurately determined. Therefore, the method according to the above embodiments can more accurately determine the pose information of the vehicle at the current position point.

The present disclosure further provides a position determination device, which will be described below in conjunction with FIG. 3.

Figure 3:
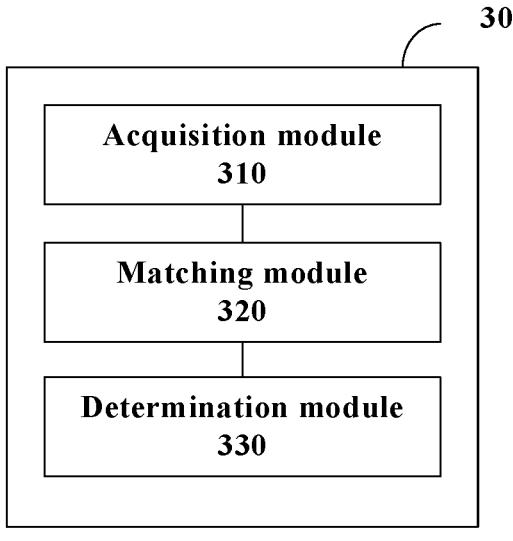
FIG. 3 illustrates a schematic structural diagram of a position determination device according to some embodiments of the present disclosure.

FIG. 3 is a block diagram of a position determination device according to some embodiments of the present disclosure. As shown in FIG. 3, the device 30 of this embodiment comprises: an acquisition module 310, a matching module 320, and a determination module 330.

The acquisition module 310 is configured to acquire laser point cloud data measured at a current position point of a vehicle as reference point cloud data, and acquire point cloud data corresponding to a preset starting point of the vehicle in a point cloud map as target point cloud data.

In some embodiments, the acquisition module 310 is configured to acquire, in the point cloud map, point cloud data centered on the preset starting point and within a range corresponding to a lidar measurement range as the target point cloud data, according to the lidar measurement range corresponding to the reference point cloud data.

The matching module 320 is configured to match the target point cloud data with the reference point cloud data to determine a transformation matrix between the target point cloud data and the reference point cloud data.

In some embodiments, the matching module 320 is configured to divide the target point cloud data into ground target point cloud data and non-ground target point cloud data, and divide the reference point cloud data into ground reference point cloud data and non-ground reference point cloud data; determine a first transformation matrix according to the ground target point cloud data and the ground reference point cloud data; and determine a second transformation matrix according to the first transformation matrix, the non-ground target point cloud data, and the non-ground reference point cloud data.

In some embodiments, the matching module 320 is configured to perform a down-sampling processing on the ground reference point cloud data to obtain down-sampled ground reference point cloud data; and match the ground target point cloud data with the down-sampled ground reference point cloud data to obtain a rotation translation matrix from the ground target point cloud data to the down-sampled ground reference point cloud data as the first transformation matrix.

In some embodiments, the matching module 320 is configured to transform the non-ground target point cloud data according to the first transformation matrix to obtain transformed non-ground target point cloud data; perform a down-sampling processing on the non-ground reference point cloud data to obtain down-sampled non-ground reference point cloud data; and match the transformed non-ground target point cloud data with the down-sampled non-ground reference point cloud data to obtain a rotation translation matrix from the transformed non-ground target point cloud data to the down-sampled non-ground reference point cloud data as the second transformation matrix.

The determination module 330 is configured to determine coordinate information of the current position point according to coordinate information of the preset starting point and the transformation matrix.

In some embodiments, the determination module 330 is configured to transform the coordinate information of the preset starting point according to the first transformation matrix to obtain first coordinate information, and take a z-axis coordinate value in the first coordinate information as a z-axis coordinate value of the current position point; and transform the first coordinate information according to the second transformation matrix to obtain second coordinate information, and take an x-axis coordinate value and a y-axis coordinate value in the second coordinate information as an x-axis coordinate value and a y-axis coordinate value of the current position point.

In some embodiments, the determination module 330 is further configured to transform preset orientation information corresponding to the preset starting point according to the first transformation matrix to obtain first orientation information, and take a roll angle value and a pitch angle value in the first orientation information as a current roll angle value and a pitch angle value of the vehicle; and transform the first orientation information according to the second transformation matrix to obtain second orientation information, and take a yaw angle value in the second orientation information as a current yaw angle value of the vehicle.

The position determination device in the embodiments of the present disclosure can be implemented by various computing devices or computer systems, which will be described below in conjunction with FIGS. 4 and 5.

Figure 4:
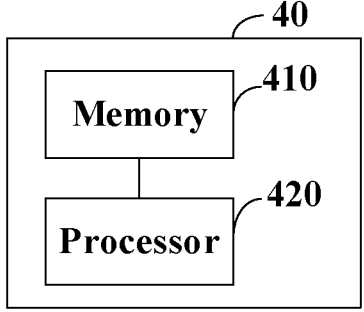
FIG. 4 illustrates a schematic structural diagram of a position determination device according to other embodiments of the present disclosure.

FIG. 4 is a block diagram of a position determination device according to some embodiments of the present disclosure. As shown in FIG. 4, the device 40 of this embodiment comprises: a memory 410 and a processor 420 coupled to the memory 410, the processor 420 being configured to perform, based on instructions stored in the memory 410, the position determination method in any of the embodiments of the present disclosure.

The memory 410 can include, for example, a system memory, fixed non-volatile storage medium, and the like. The system memory has thereon stored, for example, an operating system, application, boot loader, database, other programs, and the like. Both the memory and the processor can be implemented by employing hardware.

Figure 5:
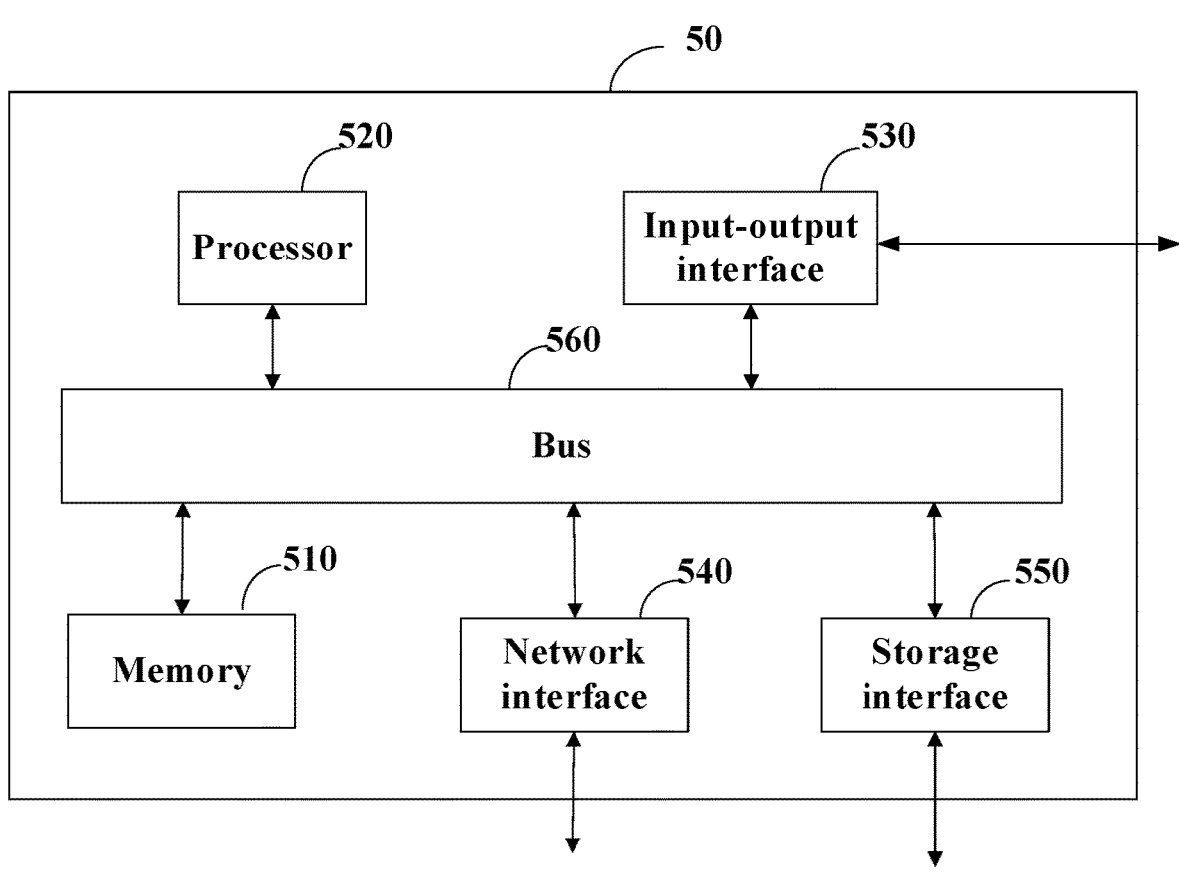
FIG. 5 illustrates a schematic structural diagram of a position determination device according to still other embodiments of the present disclosure.

FIG. 5 is a block diagram of a position determination device according to other embodiments of the present disclosure. As shown in FIG. 5, the device 50 of this embodiment comprises: a memory 510 and a processor 520, which are similar to the memory 410 and the processor 420, respectively. An input/output interface 530, network interface 540, storage interface 550, etc. can also be included. These interfaces 530, 540, 550 as well as the memory 510 and the processor 520 can be connected, for example, through a bus 560. The input/output interface 530 provides a connection interface for input/output devices such as a display, a mouse, a keyboard, and a touch screen. The network interface 540 provides a connection interface for various networking devices, for example, connected to a database server or a cloud storage server. The storage interface 550 provides a connection interface for external storage devices such as an SD card and a USB disk.

The present disclosure further provides a position determination system, which will be described below in conjunction with FIG. 6.

Figure 6:
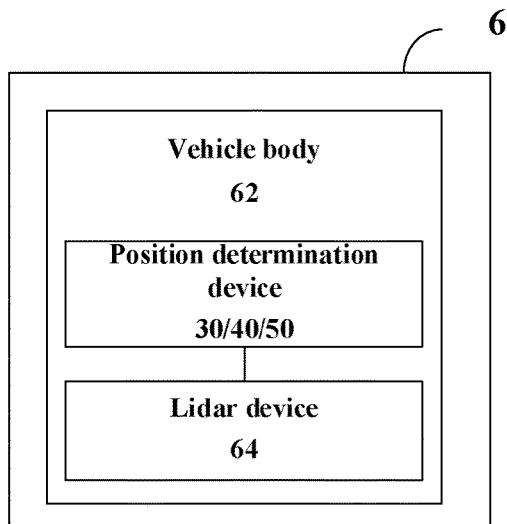
FIG. 6 illustrates a schematic structural diagram of a position determination system according to some embodiments of the present disclosure.

FIG. 6 is a block diagram of a position determination system according to some embodiments of the present disclosure. As shown in FIG. 6, the system 6 of this embodiment comprises: the position determination device 30/40/50 of any of the foregoing embodiments; a vehicle body 62, on which the position determination device 30/40/50 is arranged; and a lidar device 64 arranged on the vehicle body and configured to scan at a current position point to obtain laser point cloud data.

The present disclosure further provides a non-transitory computer-readable storage medium having thereon stored a computer program, wherein the program, when executed by a processor, implements the position determination method of any of the foregoing embodiments.

It should be appreciated by those skilled in the art that, the embodiments of the present disclosure can be provided as a method, system, or computer program product. Accordingly, the present disclosure can take a form of an entire hardware embodiment, an entire software embodiment or an embodiment combining software and hardware aspects. Furthermore, the present disclosure can take a form of a computer program product implemented on one or more computer-usable non-transitory storage media (including, but not limited to, a disk memory, CD-ROM, optical memory, and so forth) having computer-usable program code embodied therein.

The present disclosure is described with reference to flow diagrams and/or block diagrams of the method, device (system), and computer program product according to the embodiments of the disclosure. It should be understood that each flow and/or block in the flow diagrams and/or block diagrams, and a combination of flows and/or blocks in the flow diagrams and/or block diagrams, can be implemented by computer program instructions. These computer program instructions can be provided to a processor of a general-purpose computer, special-purpose computer, embedded processor, or other programmable data processing devices to produce a machine, such that the instructions, which are executed by the processor of the computer or other programmable data processing devices, create means for implementing the functions specified in one or more flows of the flow diagrams and/or one or more blocks of the block diagrams.

These computer program instructions can also be stored in a computer-readable memory that can guide a computer or other programmable data processing devices to work in a specific manner, such that the instructions stored in the computer-readable memory produce an article of manufacture including instruction means which implement the functions specified in one or more flows of the flow diagrams and/or one or more blocks of the block diagrams.

These computer program instructions can also be loaded onto a computer or other programmable data processing devices so that a series of operational steps are performed on the computer or other programmable devices to produce a computer-implemented process, and therefore, the instructions executed on the computer or other programmable devices provide steps configured to implement the functions specified in one or more flows of the flow diagrams and/or one or more blocks of the block diagrams.

The above description is only preferred embodiments of the present disclosure, and is not used for limiting the present disclosure, and any modifications, equivalents, improvements and the like that are made within the spirit and scope of the present disclosure should be included in the protection scope of the present disclosure.

What is claimed is:

1. A position determination method, executed by a position determination system, comprising:

scanning at a current position point to obtain laser point cloud data by a lidar device arranged on a vehicle body of a vehicle; and by a position determination device arranged on the vehicle body:

acquiring the laser point cloud data as reference point cloud data, and acquiring point cloud data corresponding to a preset starting point of the vehicle in a point cloud map as target point cloud data, wherein a position of the preset starting point is known and before the vehicle enters an automatic driving state, the vehicle is arranged at or near the preset starting point;

dividing the target point cloud data into ground target point cloud data and non-ground target point cloud data, and dividing the reference point cloud data into ground reference point cloud data and non-ground reference point cloud data;

determining a first transformation matrix according to the ground target point cloud data and the ground reference point cloud data;

determining a second transformation matrix according to the first transformation matrix, the non-ground target point cloud data, and the non-ground reference point cloud data;

determining coordinate information of the current position point according to coordinate information of the preset starting point, the first transformation matrix and the second transformation matrix to obtain an initial position of the vehicle;

transforming preset orientation information corresponding to the preset starting point according to the first transformation matrix to obtain first orientation information, and taking a roll angle value and a pitch angle value in the first orientation information as a current roll angle value and a pitch angle value of the vehicle; and transforming the first orientation information according to the second transformation matrix to obtain second orientation information, and taking a yaw angle value in the second orientation information as a current yaw angle value of the vehicle.

2. The position determination method according to claim 1, wherein the determining a first transformation matrix according to the ground target point cloud data and the ground reference point cloud data comprises:

performing a down-sampling processing on the ground reference point cloud data to obtain down-sampled ground reference point cloud data; and matching the ground target point cloud data with the down-sampled ground reference point cloud data to obtain a rotation translation matrix from the ground target point cloud data to the down-sampled ground reference point cloud data as the first transformation matrix.

3. The position determination method according to claim 1, wherein the determining a second transformation matrix according to the first transformation matrix, the non-ground target point cloud data, and the non-ground reference point cloud data comprises:

transforming the non-ground target point cloud data according to the first transformation matrix to obtain transformed non-ground target point cloud data;

performing a down-sampling processing on the non-ground reference point cloud data to obtain down-sampled non-ground reference point cloud data; and matching the transformed non-ground target point cloud data with the down-sampled non-ground reference point cloud data to obtain a rotation translation matrix from the transformed non-ground target point cloud data to the down-sampled non-ground reference point cloud data as the second transformation matrix.

4. The position determination method according to claim 1, wherein the determining coordinate information of the current position point according to coordinate information of the preset starting point and the transformation matrix comprises:

transforming the coordinate information of the preset starting point according to the first transformation matrix to obtain first coordinate information, and taking a z-axis coordinate value in the first coordinate information as a z-axis coordinate value of the current position point; and transforming the first coordinate information according to the second transformation matrix to obtain second coordinate information, and taking an x-axis coordinate value and a y-axis coordinate value in the second coordinate information as an x-axis coordinate value and a y-axis coordinate value of the current position point.

5. The position determination method according to claim 1, wherein the acquiring point cloud data corresponding to a preset starting point of the vehicle in a point cloud map as target point cloud data comprises:

acquiring, in the point cloud map, point cloud data centered on the preset starting point and within a range corresponding to a lidar measurement range as the target point cloud data, according to the lidar measurement range corresponding to the reference point cloud data.

6. A position determination device, comprising:

a processor; and a memory coupled to the processor and storing instructions which, when executed by the processor, cause the processor to:

control a lidar device arranged on a vehicle body of a vehicle to scan at a current position point to obtain laser point cloud data;

acquire the laser point cloud data as reference point cloud data, and acquire point cloud data corresponding to a preset starting point of the vehicle in a point cloud map as target point cloud data, wherein a position of the preset starting point is known and before the vehicle enters an automatic driving state, the vehicle is arranged at or near the preset starting point;

divide the target point cloud data into ground target point cloud data and non-ground target point cloud data, and divide the reference point cloud data into ground reference point cloud data and non-ground reference point cloud data;

determine a first transformation matrix according to the ground target point cloud data and the ground reference point cloud data;

determine a second transformation matrix according to the first transformation matrix, the non-ground target point cloud data, and the non-ground reference point cloud data;

determine coordinate information of the current position point according to coordinate information of the preset starting point, the first transformation matrix and the second transformation matrix to obtain an initial position of the vehicle;

transform preset orientation information corresponding to the preset starting point according to the first transformation matrix to obtain first orientation information, and take a roll angle value and a pitch angle value in the first orientation information as a current roll angle value and a pitch angle value of the vehicle; and transform the first orientation information according to the second transformation matrix to obtain second orientation information, and take a yaw angle value in the second orientation information as a current yaw angle value of the vehicle.

7. A position determination system, comprising: the position determination device according to claim 6;

a vehicle body, on which the position determination device is arranged; and a lidar device arranged on the vehicle body and configured to scan at the current position point to obtain the laser point cloud data.

8. The position determination device according to claim 6, wherein the determining a first transformation matrix according to the ground target point cloud data and the ground reference point cloud data comprises:

performing a down-sampling processing on the ground reference point cloud data to obtain down-sampled ground reference point cloud data; and matching the ground target point cloud data with the down-sampled ground reference point cloud data to obtain a rotation translation matrix from the ground target point cloud data to the down-sampled ground reference point cloud data as the first transformation matrix.

9. The position determination device according to claim 6, wherein the determining a second transformation matrix according to the first transformation matrix, the non-ground target point cloud data, and the non-ground reference point cloud data comprises:

transforming the non-ground target point cloud data according to the first transformation matrix to obtain transformed non-ground target point cloud data;

performing a down-sampling processing on the non-ground reference point cloud data to obtain down-sampled non-ground reference point cloud data; and matching the transformed non-ground target point cloud data with the down-sampled non-ground reference point cloud data to obtain a rotation translation matrix from the transformed non-ground target point cloud data to the down-sampled non-ground reference point cloud data as the second transformation matrix.

10. The position determination device according to claim 6, wherein the determining coordinate information of the current position point according to coordinate information of the preset starting point and the transformation matrix comprises:

transforming the coordinate information of the preset starting point according to the first transformation matrix to obtain first coordinate information, and taking a z-axis coordinate value in the first coordinate information as a z-axis coordinate value of the current position point; and transforming the first coordinate information according to the second transformation matrix to obtain second coordinate information, and taking an x-axis coordinate value and a y-axis coordinate value in the second coordinate information as an x-axis coordinate value and a y-axis coordinate value of the current position point.

11. The position determination device according to claim 6, wherein the acquiring point cloud data corresponding to a preset starting point of the vehicle in a point cloud map as target point cloud data comprises:

acquiring, in the point cloud map, point cloud data centered on the preset starting point and within a range corresponding to a lidar measurement range as the target point cloud data, according to the lidar measurement range corresponding to the reference point cloud data.

12. A non-transitory computer-readable storage medium storing computer programs, which when executed by a processor, cause the processor to:

control a lidar device arranged on a vehicle body of a vehicle to scan at a current position point to obtain laser point cloud data;

acquire the laser point cloud data as reference point cloud data, and acquire point cloud data corresponding to a preset starting point of the vehicle in a point cloud map as target point cloud data, wherein a position of the preset starting point is known and before the vehicle enters an automatic driving state, the vehicle is arranged at or near the preset starting point;

divide the target point cloud data into ground target point cloud data and non-ground target point cloud data, and divide the reference point cloud data into ground reference point cloud data and non-ground reference point cloud data;

determine a first transformation matrix according to the ground target point cloud data and the ground reference point cloud data;

determine a second transformation matrix according to the first transformation matrix, the non-ground target point cloud data, and the non-ground reference point cloud data;

determine coordinate information of the current position point according to coordinate information of the preset starting point, the first transformation matrix and the second transformation matrix to obtain an initial position of the vehicle;

transform preset orientation information corresponding to the preset starting point according to the first transformation matrix to obtain first orientation information, and take a roll angle value and a pitch angle value in the first orientation information as a current roll angle value and a pitch angle value of the vehicle; and transform the first orientation information according to the second transformation matrix to obtain second orientation information, and take a yaw angle value in the second orientation information as a current yaw angle value of the vehicle.

13. The non-transitory computer-readable storage medium according to claim 12, wherein the determining a first transformation matrix according to the ground target point cloud data and the ground reference point cloud data comprises:

performing a down-sampling processing on the ground reference point cloud data to obtain down-sampled ground reference point cloud data; and matching the ground target point cloud data with the down-sampled ground reference point cloud data to obtain a rotation translation matrix from the ground target point cloud data to the down-sampled ground reference point cloud data as the first transformation matrix.

14. The non-transitory computer-readable storage medium according to claim 12, wherein the determining a second transformation matrix according to the first transformation matrix, the non-ground target point cloud data, and the non-ground reference point cloud data comprises:

transforming the non-ground target point cloud data according to the first transformation matrix to obtain transformed non-ground target point cloud data;

performing a down-sampling processing on the non-ground reference point cloud data to obtain down-sampled non-ground reference point cloud data; and matching the transformed non-ground target point cloud data with the down-sampled non-ground reference point cloud data to obtain a rotation translation matrix from the transformed non-ground target point cloud data to the down-sampled non-ground reference point cloud data as the second transformation matrix.

15. The non-transitory computer-readable storage medium according to claim 12, wherein the determining coordinate information of the current position point according to coordinate information of the preset starting point and the transformation matrix comprises:

transforming the coordinate information of the preset starting point according to the first transformation matrix to obtain first coordinate information, and taking a z-axis coordinate value in the first coordinate information as a z-axis coordinate value of the current position point; and transforming the first coordinate information according to the second transformation matrix to obtain second coordinate information, and taking an x-axis coordinate value and a y-axis coordinate value in the second coordinate information as an x-axis coordinate value and a y-axis coordinate value of the current position point.

16. The non-transitory computer-readable storage medium according to claim 12, wherein the acquiring point cloud data corresponding to a preset starting point of the vehicle in a point cloud map as target point cloud data comprises:

acquiring, in the point cloud map, point cloud data centered on the preset starting point and within a range corresponding to a lidar measurement range as the target point cloud data, according to the lidar measurement range corresponding to the reference point cloud data.

\* \* \* \* \*